United States Patent
Nugent et al.

(10) Patent No.: US 10,623,073 B2
(45) Date of Patent: Apr. 14, 2020

(54) REMOTE UNIT DOCKING STATION FOR PACKET/DIGITAL ENERGY TRANSFER TELECOMMUNICATIONS SYSTEMS

(71) Applicant: John Mezzalingua Associates, LLC, Liverpool, NY (US)

(72) Inventors: Adam T. Nugent, Canastota, NY (US); Christopher P. Natoli, Baldwinsville, NY (US); Todd Landry, Greyslake, IL (US); Matthew Cooke, Liverpool, NY (US); Leon Marketos, Auburn, NY (US); Shawn M. Chawgo, Cicero, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 0 days.

(21) Appl. No.: 16/329,354

(22) PCT Filed: Aug. 31, 2017

(86) PCT No.: PCT/US2017/049593
§ 371 (c)(1),
(2) Date: Feb. 28, 2019

(87) PCT Pub. No.: WO2018/045159
PCT Pub. Date: Mar. 8, 2018

(65) Prior Publication Data
US 2019/0222278 A1 Jul. 18, 2019

Related U.S. Application Data

(60) Provisional application No. 62/381,957, filed on Aug. 31, 2016.

(51) Int. Cl.
*H04M 1/00* (2006.01)
*H04B 7/06* (2006.01)
(Continued)

(52) U.S. Cl.
CPC ............... *H04B 7/06* (2013.01); *G02B 6/44* (2013.01); *G02B 6/4416* (2013.01); *H01Q 1/246* (2013.01);
(Continued)

(58) Field of Classification Search
CPC ........ H04B 7/06; H01Q 1/246; H01Q 21/205; H04W 88/08; H04W 48/02; H02S 40/32; G02B 6/44; G02B 6/4416
(Continued)

(56) References Cited

U.S. PATENT DOCUMENTS

| 5,508,712 A | 4/1996 | Tom et al. |
| 2011/0032158 A1* | 2/2011 | Rodger ............ H01Q 1/02 343/702 |

(Continued)

OTHER PUBLICATIONS

International Search Report and Written Opinion; International Application No. PCT/US17/49593; dated Oct. 27, 2017 and dated Nov. 17, 2017, 11 pages.
(Continued)

*Primary Examiner* — Huy C Ho
(74) *Attorney, Agent, or Firm* — Barclay Damon LLP

(57) ABSTRACT

A mounting arrangement for securing a remote radio unit in combination with a telecommunications tower or elevated structure for mounting a telecommunication antenna. The mounting arrangement includes a docking station comprising: (i) a control unit having at least two openings through an upper wall of the control unit for receiving each remote radio unit, (ii) a sealing gasket disposed about the periphery of each opening; (iii) at least one pair of guide rails projecting upwardly from the upper wall of the control unit and between the at least two openings, and (iv) a mechanism for producing a watertight seal between the control unit and each remote unit. The control unit defines an internal enclosure for housing an electronic interface configured to pro-
(Continued)

vide digital energy and exchange data between each remote unit and a base station. The guide rails of the docking station are configured to slidably receive, and guide each of the remote unit into the openings of the control unit. The sealing mechanism is configured to forcibly urge each remote unit against the sealing gasket to produce a watertight seal therebetween.

16 Claims, 4 Drawing Sheets

(51) Int. Cl.
  *H01Q 1/24*  (2006.01)
  *H02S 40/32*  (2014.01)
  *H04W 48/02*  (2009.01)
  *G02B 6/44*  (2006.01)
  *H01Q 21/20*  (2006.01)
  *H04W 88/08*  (2009.01)

(52) U.S. Cl.
  CPC ........... *H01Q 21/205* (2013.01); *H02S 40/32* (2014.12); *H04W 48/02* (2013.01); *H04W 88/08* (2013.01)

(58) Field of Classification Search
  USPC ...................................................... 455/562.1
  See application file for complete search history.

(56) References Cited

U.S. PATENT DOCUMENTS

| | | |
|---|---|---|
| 2012/0293391 A1 | 11/2012 | Simmons et al. |
| 2012/0295486 A1 | 11/2012 | Petersen et al. |
| 2014/0179244 A1* | 6/2014 | Colapietro ............... H04B 1/40 |
| | | 455/90.2 |
| 2016/0134331 A1 | 5/2016 | Eaves |
| 2016/0173672 A1 | 6/2016 | Boyce |

OTHER PUBLICATIONS

International Preliminary Report on Patentability, International Application No. PCT/US17/49593; dated Mar. 5, 2019, 8 pages.

* cited by examiner

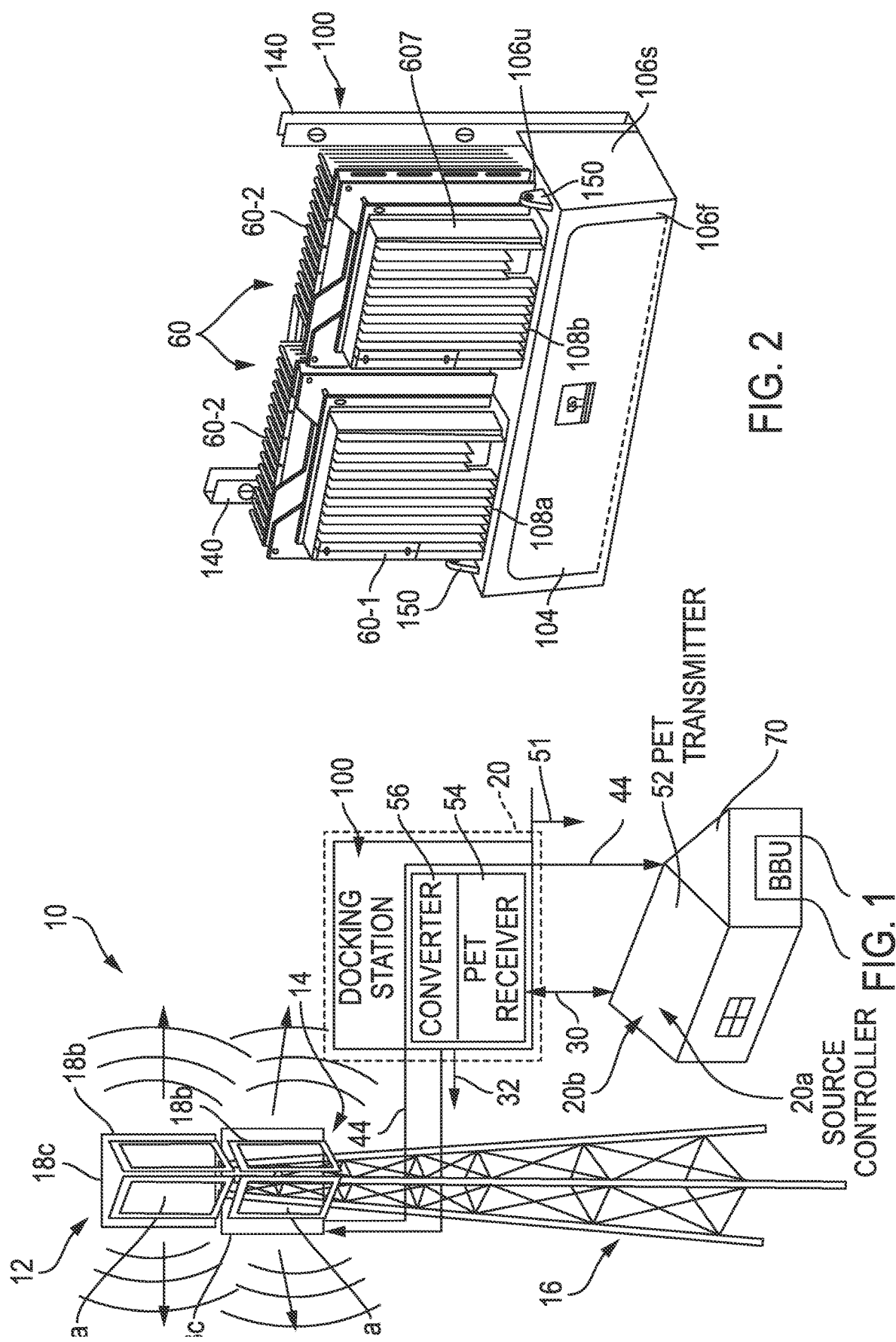

REMOTE UNIT DOCKING STATION FOR PACKET/DIGITAL ENERGY TRANSFER TELECOMMUNICATIONS SYSTEMS

CROSS-REFERENCE TO RELATED APPLICATIONS

This application claims the benefit of the priority date of U.S. Provisional Application Ser. No. 62/381,957 filed Aug. 31, 2016 entitled "REMOTE UNIT DOCKING STATION FOR PACKET/DIGITAL ENERGY TRANSFER TELECOMMUNICATIONS SYSTEMS", the specification of which is hereby incorporated in its entirety.

BACKGROUND

The present invention relates to a novel mounting system for securing one or more remote units of a telecommunications system to a macro antenna system (MAS) tower and, more particularly, to a docketing station therefor which mounts multiple remote units into a compact arrangement facilitating repair, replacement, and maintenance of each remote unit while furthermore facilitating a watertight seal between the docking station and each remote unit.

An outdoor wireless communication network typically includes a cell site having a base station, a cell tower, and a plurality of macro antennas mounted to the cell tower. The macro antennas are powered and arranged to transmit wireless broadband signals to communication devices, e.g., cell phones, within a defined area, typically, an area spanning about one (1) to two (2) miles. Received signals are transmitted upstream to a service provider and forwarded downstream to a destination cell tower or, if a call spans a larger distance such as might happen when making an international call, via the utilization of a telecommunications satellite.

The base station may include a tower, mounting a plurality of exterior antennas, at least one Remote Radio Unit (RRU), and a ground shelter proximal to the tower, enclosing a variety of base station equipment. A plurality of exterior macro/sector antennas and remote radio heads (RRHs) are operatively coupled, and mounted adjacent to, each exterior antenna. Each RRH manages the distribution of signals between its associated macro/sector antenna and the base station equipment. The base station equipment may, in turn, include electrical hardware operable to transmit/receive radio signals and to encrypt/decrypt communications signals with a mobile telephone switching office. The base station equipment also includes power supply units and equipment for powering and controlling the antennas and other devices mounted to the tower.

A distribution line, such as coaxial or fiber optic cable, distributes signals that are exchanged between the base station equipment and tower-mounted antennas, however, transmission losses occur that can exceed several decibels. These transmission losses are mitigated by locating each remote radio unit in close proximity to the tower-mounted macro/sector antenna to minimize the distance required for power and data to travel between the RRU and the respective macro/sector antenna.

Presently, each macro antenna may be configured to transmit up to nine hundred (900) distinct frequency bands or channels. While each antenna may transmit any one of the available frequency bands, RRUs are configured to uplink/downlink only a fraction of the total available bands due to a variety of technical and business issues, including the license fees associated with broadband usage, i.e., fees charged by the Federal Communications Commission or "the FCC." Remote radio heads are routinely deployed and removed depending upon the availability of broadband signals and customer requirements. There is a significant burden associated with deploying RRHs which are configured for each of the many frequency bands transmitted by the service providers.

While the use of an RRH mitigates signal degradation, i.e., by minimizing the length of the required coaxial cable, the transition from fiber-to-cable (internally of the RRH) and from cable-to-fiber (internally of the antenna), continues to adversely impact signal performance and efficiency. Cabling internally of the tower-mounted antenna can produce difficulties inasmuch as the internal space is confined and real estate at a premium.

Finally, as the number of broadband channels increase, i.e., the number which become available via the FCC, so too does the number of service providers. And, as the number of service providers increase, so too will the number of macro antennas and RRHs. As a consequence, the cost associated with managing the implementation of the new antennas and RRHs continues to grow. The present business environment requires a degree of flexibility which does not exist with the current RRHs/antenna systems currently deployed in the field.

Flexibility may be improved by increasing the number and capacity of RRUs currently deployed. Unfortunately, a system for rapid deployment and change from a low-voltage power distribution system to a high-voltage power distribution system also does not exist nor does the infrastructure for making such change. An infrastructure suitable for the rapid deployment and change of RRUs/RRHs is needed, both in the field and in an upstream headend facility.

The foregoing background describes some, but not necessarily all, of the problems, disadvantages and shortcomings related to telecommunications systems currently deployed.

SUMMARY

A mounting arrangement is provided for securing a remote radio unit in combination with a telecommunications tower or elevated structure for mounting a telecommunication antenna. The mounting arrangement includes a docking station comprising: (i) a control unit having at least two openings through an upper wall of the control unit for receiving each remote radio unit, (ii) a sealing gasket disposed about the periphery of each opening; and (iii) at least one pair of guide rails projecting upwardly from the upper wall of the control unit and between the at least two openings, and (iv) a mechanism for producing a watertight seal between the control unit and each remote unit. Additionally, the control unit defines an internal enclosure for housing an electronic interface configured to power and exchange data between each remote unit and a base station. The guide rails of the docking station are configured to slidably receive, and guide each connector end of the remote unit into the openings of the control unit. Furthermore, the sealing mechanism is configured to forcibly bias each remote unit against the sealing gasket to produce a watertight seal therebetween.

BRIEF DESCRIPTION OF THE DRAWINGS

Additional features and advantages of the present disclosure are described in, and will be apparent from, the following Brief Description of the Drawings and Detailed Description.

FIG. 1 depicts a macro antenna system (MAS) including a base station, an elevated tower, one or more telecommunications antennas mounted to the tower, and a schematic of a docking station useful for mounting a plurality of individual Remote Radio Units.

FIG. 2 is an isolated perspective view of the docking station for mounting to an elevated tower of the MAS telecommunication system.

DETAILED DESCRIPTION

Figure 3:
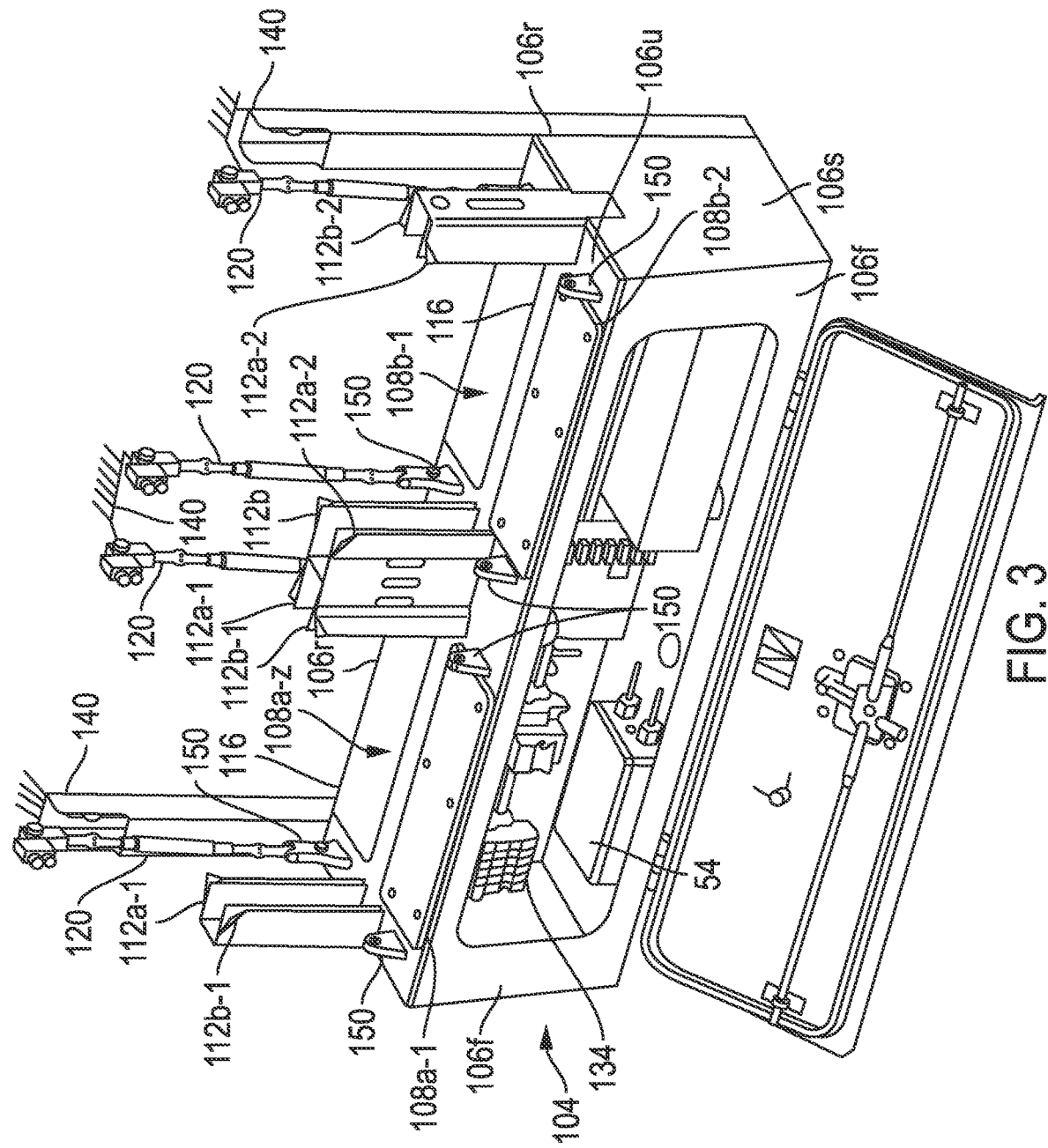
FIG. 3 is view of the docking station having a control unit, a plurality of mounting rails for accepting a plurality of remote radio units (not shown in FIG. 3), and a plurality of turnbuckles mounting to the control unit and configured to effect a watertight seal between each remote unit and the control unit of the docking station.
Figure 4:
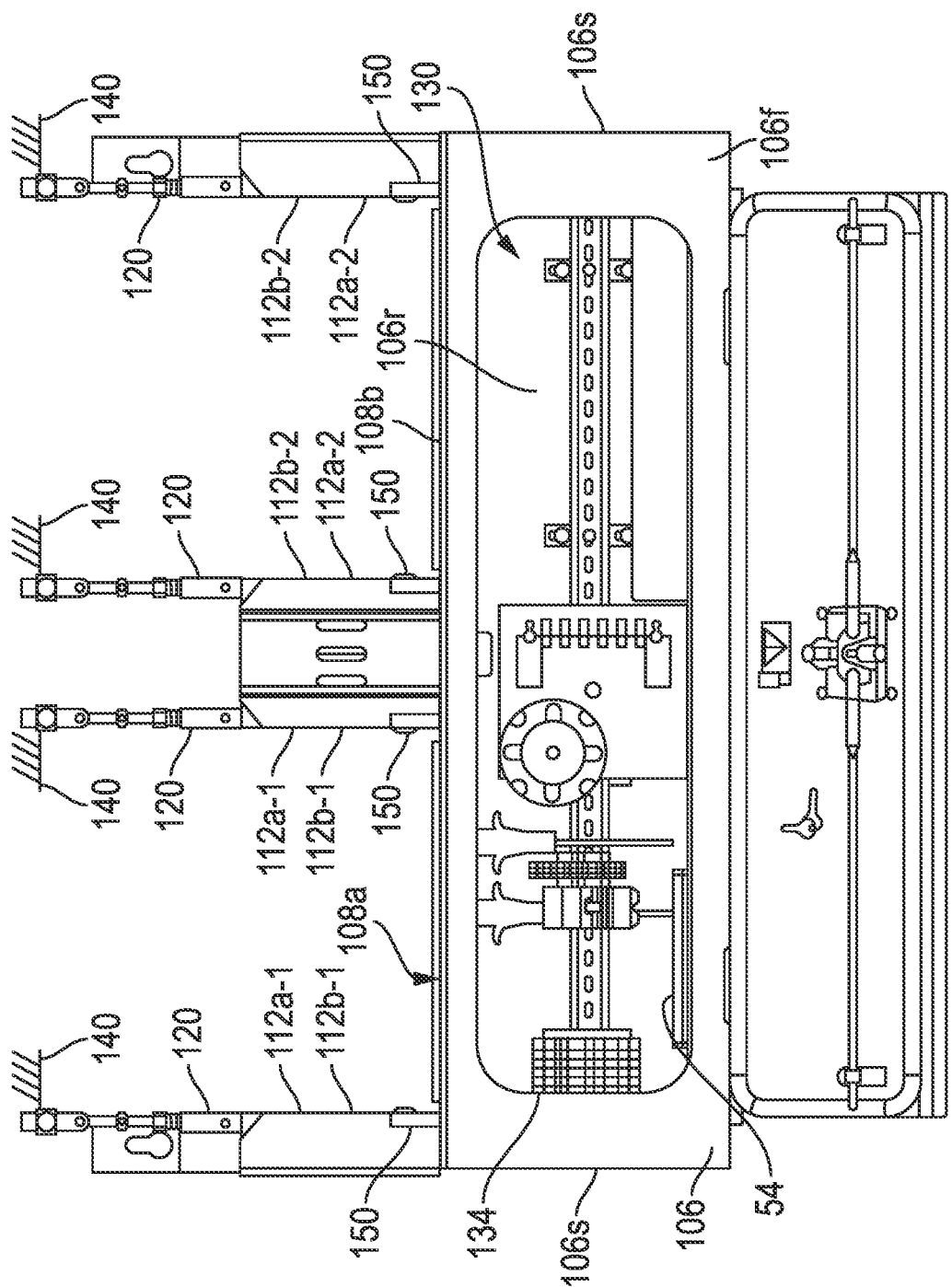
FIG. 4 is a front view of the docking station depicted in FIG. 3 having an access door shown in an open position to reveal the internal components housed within the enclosure of the control unit.

The disclosure is directed to a new and useful arrangement for mounting a plurality of Remote Radio Units (RRUs) in combination with a telecommunications tower, antenna scaffolding or other elevated structure. As mentioned in the Background of the Invention, such units bring power and data in close proximity to the respective telecommunications antennas for the purpose of reducing the distance, and consequently, the thickness, weight and cost of the telecommunications cabling associated with powering each of the telecommunications antennas.

In FIG. 1, the mounting arrangement is shown and described in the context of a Macro Antenna or MAS Telecommunication System 10 which transmits/receives RF signals to/from a Base Transceiver Station (BTS) 20. The described embodiment depicts two (2) multi-sector antenna systems 12 and 14, each mounted to an elevated structure, i.e., a tower 16, one mounted atop the other. Each of the multi-sector antennas 12, 14 comprise three (3) sector antennas 18a, 18b, 18c operative to transmit/receive telecommunication signals in a one-hundred and twenty degree (120°) sector. The sector antennas 18a, 18b, 18c combine to produce a three-hundred and sixty degree (360°) omni-directional RF radiation pattern.

In this embodiment, a power component 20P of a power/data distribution system 20: (i) conveys power over a high gauge, low weight copper cable 30, (ii) maintains power at a first level above a threshold on one first side (identified by arrow S1) of a distribution box or docking station 100, and (iii) reduces power to a second level below the threshold on a second side (denoted by arrow S2) of the docking station 100. In the described embodiment, the threshold relates to a voltage which may safely be handled by telecommunications operators/technicians. Such level is generally within a range of between about forty-five volts 45V DC to about sixty volts 60V DC. A data component 20D of the power/data distribution system 20 may be: (i) carried over a conventional, light-weight, fiber optic cable 44, and (ii) passed directly through the docking station 100. With respect to the latter, the data cable 44 may be passed over, or around, the docking station 100 without discontinuing, breaking or changing the cable from one type of cable to another type. Alternatively, the fiber optic cable 44 may be terminated in the docking station 100 and converted, by a fiber switch, from an optic data cable into a conductive cable suitable for carrying a data signal over a coaxial cable.

Digital Energy (DE) or Packet Energy Transfer (PET) technology may be employed on the first, or upstream side S1, of the docking station 100 while analog energy or power, i.e., conventional AC/DC power, may be employed on the second or downstream side S2 of the docking station 100. In the context used herein, digital energy is characterized by the delivery of discrete packets of energy conveyed on periodic or regular schedule over a conductive wire cable. In the described embodiment, the digital energy employed is high potential, e.g., at or above three-hundred forty-five volts (DC 345 V).

Digital energy offers an alternative mechanism for safe handling of the delivered power and, for all practical purposes, does not have an upper limit for the packets of digital energy. Furthermore, since PET technology may be delivered over high gauge, low weight, metal/copper cable, conventional Category 5 or 6 coaxial cable may be used on the first, or upstream side S1 of the Power Distribution System (PDS). The second, or downstream side S2 of the PDS may employ analog power which may be carried by conventional direct or alternating current.

The digital energy system 50 includes a Digital Energy/PET transmitter 52, generally located within the Base Station 70, and a Digital Energy/PET receiver 54 generally located within the docking station 100 for powering the Remote units 60. The docking station 100 will also generally include a DC-to-DC power converter 56 inasmuch as each Remote Radio Unit 60 is powered by direct current.

FIGS. 2 and 3 depict perspective views of the docking station 100 configured for mounting and electrically connecting at least one pair of RRUs 60 to each of the telecommunications antennas 12, 14, however, it will be appreciated that the docking station 100 may be configured to mount and electrically connect several pairs of RRUs, i.e., two, four or eight RRUs 60. FIG. 2 depicts two pairs of side-by-side or front-to-back remote radio units 60-1, 60-2. The docking station 100 includes: (i) a lower control unit 104 including an upper wall 106U (best seen in FIG. 3) defining at least one pair of openings 108a, 108b, (ii) at least one pair of guide rails 112a, 112b projecting upwardly from the upper wall 106U of the lower control unit 104 and between the at least two openings 108a, 108b, and (iii) a mechanism 120 configured to forcibly bias each remote unit 60-1,60-2 into the respective opening 108a, 108b of the control unit 104 to produce a watertight seal between each remote unit 60 and the control unit 104. In the described embodiment, a sealing gasket 116 is disposed about the periphery of each opening 108a, 108b to facilitate the formation of the watertight seal between each of the remote units 60-1,60-2 and the respective opening 108a, 108b.

The control unit 104 defines a conductive enclosure 130 for housing an electronic interface 134 configured to power to each of the telecommunications antenna 12, 14 and exchange data between each remote unit 60 and the base station or head-end facility. As mentioned above, power may be transmitted using a conventional coaxial cable, i.e., Category 5 or Category 6 copper cable, while data may be transmitted via optic fiber cable. In the described embodiment, the power distribution system 20 may be combined or integrated with the docking station 100. More specifically, the enclosure 130 of the control unit 104 may house the DE Receiver 54 designed to receive packets of digital energy from the DE Transmitter 52 located below in the MAS base station 70. The walls 106U, 106F, 106S of the enclosure 130 are conductive to electrically protect the DE receiver 54 from electrical surges such as may be caused by lightning strikes.

In FIGS. 1 through 4, the upper wall 106U defines four openings 108*a*-1, 108*b*-1, 108*a*-2, 108*b*-2 which are arranged in front-to-back or side-by-side relationship relative to the front and rear walls 106F, 106R of the control unit 104. These same four openings 108*a*-1, 108*a*-2, 108*b*-1, 108*b*-2 are arranged in a side-by-side relationship relative to the side walls 106S of the control unit 104. Further, a first pair of back-to-back guide rails 112*a*-1, 112*b*-1, and a second pair of side-by-side guide rails 112*a*-1, 112*b*-1, 112*a*-2, 112*b*-2 form adjacent back-to-back, and juxtaposed, side-by-side channels/guides to receive each of the two pairs of remote units 60-1, 60-2.

In the described embodiment, the sealing gasket 116 may be disposed along the entire upper wall 106U of the control unit 104 or selectively around each of the openings 108*a*-1, 108*b*-1, 108*a*-2, 108*b*-2, i.e., the peripheral edges or surfaces thereof. The guide rails 112*a*-1, 112*b*-1, 112*a*-2, 112*b*-2 project upwardly from, and generally orthogonal to, the upper wall 106U of the control unit 104. The guide rails 112*a*-1, 112*b*-1, 112*a*-2, 112*b*-2 are vertically oriented to allow gravity to augment the sealing effectiveness of the sealing gasket 116. To further assist the sealing effectiveness between each of the remote units 60-1, 60-2 and the control unit 104 of the docking station 100, the mechanism 120 forcibly augments gravity to urge each of the remote units 60-1, 60-2 against the upper wall 106U of the control unit 104, and consequently, against the sealing gaskets 116 disposed about each of the openings 108*a*-1, 108*b*-1, 108*a*-2, 108*b*-2.

In the described embodiment, a plurality of turnbuckles 120 are disposed between the control unit 104 and a stationary mounting structure 140 to which the docketing station 100 is secured. Each turnbuckle is preferably secured to a mounting lug 150 disposed in combination with the upper wall 106U of the control unit 104 and, preferably to each corner of the control unit 104. Each turnbuckle 120 may be rotated to raise the docking station 100, i.e., the control unit 104, upwardly against the remote units 60*a*, 60*b*, thereby increasing the contact force between the remote units 60*a*, 60*b* and the sealing gasket 116.

Figure 5C:
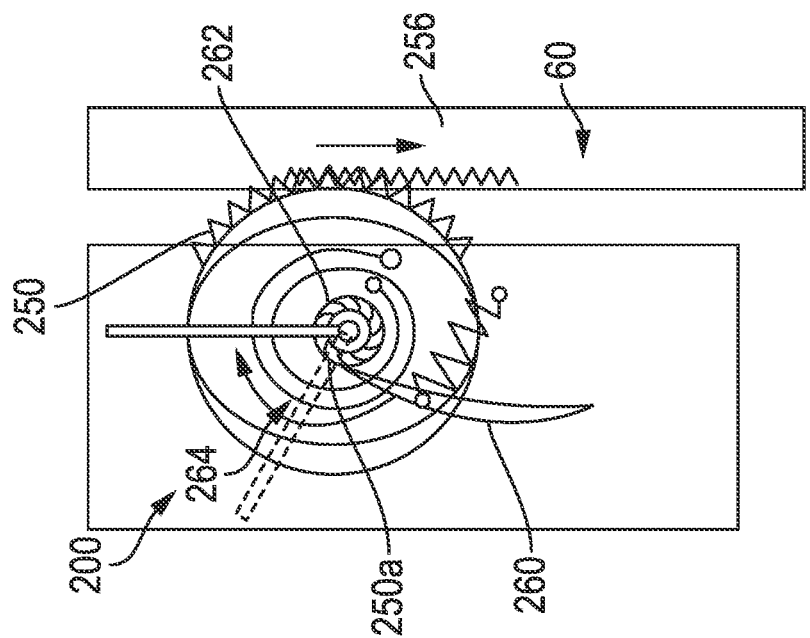
FIGS. 5a, 5b and 5c depict another embodiment of the sealing mechanism configured to impart a watertight seal between each remote unit and the control unit of the docking station.
Figure 5B:
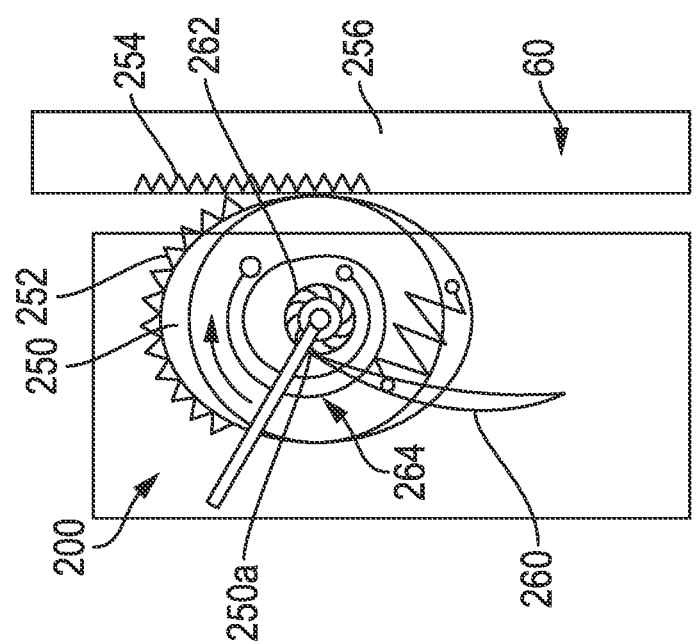
Figure 5A:
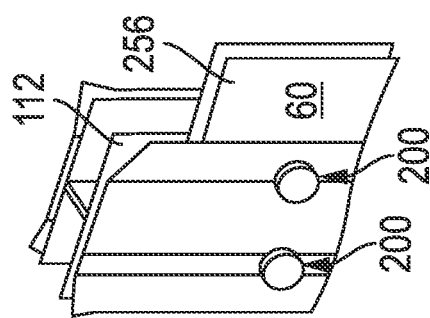

In another embodiment, and referring to FIGS. 5*a*, 5*b*, and 5*c* of the drawings, a ratcheted cam device 200 may engage the guide rails of the remote radio units to effect a watertight seal between the remote units and the docking station 100. More specifically, a ratcheted cam gear 250 may rotate in a clockwise direction about a rotational axis 250A to bring the gear teeth 252 into engagement with a linear rack of gear teeth 254. The gear teeth 254 may be disposed along at least one of the guide rails 256 of each remote radio unit 60. As the cam gear teeth 252 engage the linear gear teeth along the rack 254, the respective remote radio unit 60 is driven downwardly to forcibly urge the remote radio unit against the sealing gasket 116 disposed about the respective openings in the control unit 104. A biased ratchet pawl 260 engages the ratchet gear 250 about the periphery of a ratchet wheel 262 which is coaxial with the cam gear 250 and disposed about the rotational axis 250A thereof. Furthermore, the entire cam gear 250 may be biased by a torsion spring 264 such that when the gear 250 rotates in a clockwise direction, the gear 250 winds-up against the action of the biased pawl 260. More specifically, as the cam gear 250 rotates in a clockwise direction, the biased pawl 260 prevents the ratcheted cam gear 250 from rotating the opposing direction, i.e., in a counter-clockwise direction.

In operation, the cam gear 250 rotates in a clockwise direction to effect engagement of the cam gear teeth 252 with the linear gear teeth 254 of the remote unit, i.e., the guide rails 256 thereof. As the gear 250 is rotated clockwise, the guide rails 256 move downwardly in the direction of arrow A against the sealing gasket 116. At the same time, the ratchet pawl 260 locks the rotational position of the cam gear 250 and the linear position of the remote radio unit. The guide rail 256 of each remote radio unit 60 may be released by pulling the pawl 260 out of engagement with the ratchet wheel 262, thereby permitting counter-rotation of the cam gear 250, i.e., facilitated by the biasing action of the torsion spring.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The following is claimed:

1. A mounting arrangement for connecting a plurality of remote radio units to one or more telecommunications antennas, each remote unit having a connector end for receiving power and telecommunications data, comprising:
    a docking station having:
        a control unit defining an internal enclosure for housing an electronic interface configured to power and exchange data between each remote unit and a base station, the control unit having an upper wall defining a first pair of openings arranged front-to-back relative to a front and a rear wall of the control unit and a second pair of openings arranged side by side with respect to the first pair of openings and adjacent a side wall of the control unit, each opening receiving the connector end of the remote unit;
        a sealing gasket disposed about the periphery of each of the first and second pairs of openings;
        a combination integral back-to-back and juxtaposed side-by-side, C-shaped guide rails projecting upwardly from the upper wall of the control unit and between the first and second pairs of openings; and
        a mechanism configured to forcibly urge each remote unit against the sealing gasket to produce a watertight seal therebetween, wherein the guide rails are configured to slideably receive and guide the connector ends of at least remote units into the openings and wherein the mechanism to forcibly urge the remote units into engagement include at least one turnbuckle operative to raise and urge the control unit against the remote units.

2. The mounting arrangement of claim 1 wherein the internal enclosure of the control unit houses at least one digital energy receiver for energizing each remote unit.

3. The mounting arrangement of claim wherein the at least one turnbuckle is articulately mounted to the upper wall of the control unit, and wherein each remote unit is spatially fixed to facilitate relative motion between the control unit and the at least one pair of remote units.

4. The mounting arrangement of claim 1 wherein the mechanism to produce a watertight seal comprises a cam gear disposed in combination with a series of gear teeth disposed in combination with at least one of the guide rails.

5. The mounting arrangement of claim 1 wherein the control unit includes an access panel disposed through a front wall thereof.

6. The mounting arrangement of claim 1 wherein the control unit housing includes a plurality of electrical connectors and at least one digital energy receiver.

7. The mounting arrangement of claim 6 wherein the control unit includes a lower wall defining at least one aperture for accepting a power cable for delivering Packet Energy Technology (PET) digital energy from a PET digital energy source to the PET digital energy receiver within the control unit.

8. The mounting arrangement of claim 7 wherein the lower wall defines at least one aperture for accepting a fiber optic cable for exchanging optical data from the base transceiver station to each remote unit.

9. The mounting arrangement of claim 1 wherein the guide rails are oriented substantially vertically to maximize the gravitational effect of the remote unit to produce a watertight seal along the sealing gasket.

10. The mounting arrangement of claim 1 wherein the guide rails each include a retention pin for securing the remote unit to the docking station.

11. The mounting arrangement of claim 1 wherein the sealing gasket comprises an elastomer and the guide rails are secured the remote unit to the docking station.

12. A docking station for mounting a plurality of remote radio units comprising:

a control unit housing an electronic interface configured to power and exchange data between each remote unit and a base station, the control unit having an upper wall defining a first pair of openings arranged front-to-back relative to a front and a rear wall of the control unit and a second pair of openings arranged side by side with respect to the first pair of openings and adjacent a side wall of the control unit, each of the openings receiving a connector end of each remote radio unit;

a combination integral back-to-back and juxtaposed side-by-side, C-shaped guide rails projecting upwardly from the upper wall of the control unit and between the first and second pairs of openings; and a mechanism configured to forcibly urge each remote unit against a peripheral surface of each of the openings to produce a watertight seal therebetween, wherein the guide rails are configured to slideably receive and guide the connector ends of at least two remote units into the openings.

13. The docking station according to claim 12 further comprising including a sealing gasket disposed about the periphery of each opening.

14. The docking station of claim 12 wherein the mechanism to produce a watertight seal comprises at least one turnbuckle operative to raise and urge the control unit against the at least one pair of remote units.

15. The docking station of claim 12 wherein the at least one turnbuckle is articulately mounted to the upper wall of the control unit and wherein each remote unit is spatially fixed to facilitate relative motion between the control unit and the at least one pair of remote units.

16. The docking station of claim 12 wherein the mechanism to produce a watertight seal comprises a cam gear disposed in combination with a series of gear teeth disposed in combination with at least one of the guide rails.

* * * * *